United States Patent
Doradla et al.

(10) Patent No.: US 8,351,946 B2
(45) Date of Patent: Jan. 8, 2013

(54) METHOD FOR SEAMLESS COMMUNICATIONS BETWEEN A COMMUNICATION DEVICE AND WIRELESS ACCESS POINTS

(75) Inventors: Anil K. Doradla, Austin, TX (US); Rias Muhamed, Austin, TX (US); Sreenivasa R. Gorti, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1223 days.

(21) Appl. No.: 11/313,064

(22) Filed: Dec. 20, 2005

(65) Prior Publication Data

US 2007/0140220 A1 Jun. 21, 2007

(51) Int. Cl.
*H04W 36/00* (2009.01)
(52) U.S. Cl. ........ 455/441; 455/436; 455/437; 455/438; 455/439; 455/440
(58) Field of Classification Search .................. 370/331; 455/441
See application file for complete search history.

(56) References Cited

U.S. PATENT DOCUMENTS

| | | | | |
|---|---|---|---|---|
| 5,513,380 A | * | 4/1996 | Ivanov et al. | 455/441 |
| 5,619,551 A | * | 4/1997 | Yahagi | 455/445 |
| 7,046,647 B2 | * | 5/2006 | Oba et al. | 370/331 |
| 2004/0203873 A1 | * | 10/2004 | Gray | 455/456.1 |

FOREIGN PATENT DOCUMENTS

GB 2366705 3/2002

* cited by examiner

*Primary Examiner* — Wayne Cai
*Assistant Examiner* — Huy C Ho
(74) *Attorney, Agent, or Firm* — Toler Law Group, PC

(57) ABSTRACT

A system and methods (300, 400) are disclosed for seamless communications between a communication device and wireless access points. A system that incorporates teachings of the present disclosure may include, for example, a multimode communication device (MCD) (106) having a controller (214) to manage operations of a global position (GPS) receiver (212), and a multimode wireless transceiver (202). The controller can be programmed to authenticate (304) the MCD with a first wireless access point, request and receive (306) a first IP address, establish (308) communications with a network management system (NMS) (100) according to the first IP address, transmit (310) to the NMS a location of the MCD, receive (320) a second IP address from the NMS in response to the NMS determining that the MCD is near a second wireless access point, and establish (330) communications over the second wireless access point according to the second IP address. Embodiments for the NMS are also disclosed.

17 Claims, 5 Drawing Sheets

500

METHOD FOR SEAMLESS COMMUNICATIONS BETWEEN A COMMUNICATION DEVICE AND WIRELESS ACCESS POINTS

RELATED APPLICATION

U.S. patent application Ser. No. 11/296,721, filed Dec. 6, 2005, by Doradla et al., entitled "Method for Conserving Energy in a Multimode Communication Device," incorporated herein by reference.

U.S. patent application Ser. No. 11/312,119, filed Dec. 20, 2005, by Muhamed et al., entitled "Method for Enabling Communications Between a Communication Device and a Wireless Access Point," incorporated herein by reference.

FIELD OF THE DISCLOSURE

The present disclosure relates generally to communication techniques, and more specifically to a method for seamless communications between a communication device and wireless access points.

BACKGROUND

As WiFi makes its way into cellular phones, configuring these devices can be burdensome. Basic WiFi provisioning requires a Network ID (generally referred to as the Service Set Identifier or SSID) and encryption keys to be configured properly in the phone and the access point. In some applications, it is possible for a phone to automatically detect an SSID from a beacon signal broadcast by the access point, thereby avoiding the need to manually configure it. However, for security purposes the access point may be provisioned to disable the broadcast of the SSID, in which case the end user of the phone needs to manually configure the phone with the SSID and one or more encryption keys.

Once provisioned, the cell phone also needs to request an IP address from a Dynamic Host Configuration Protocol (DHCP) server. Acquiring an IP address can take a few seconds, thereby stalling the process for enabling communications. For dual-mode cell phones that roam from one wireless access point to another, the handoff process can severely impact communications such as Voice over IP (VoIP) taking place in a previous access point.

A need therefore arises for a method for seamless communications between a communication device and wireless access points.

DETAILED DESCRIPTION

Figure 1:
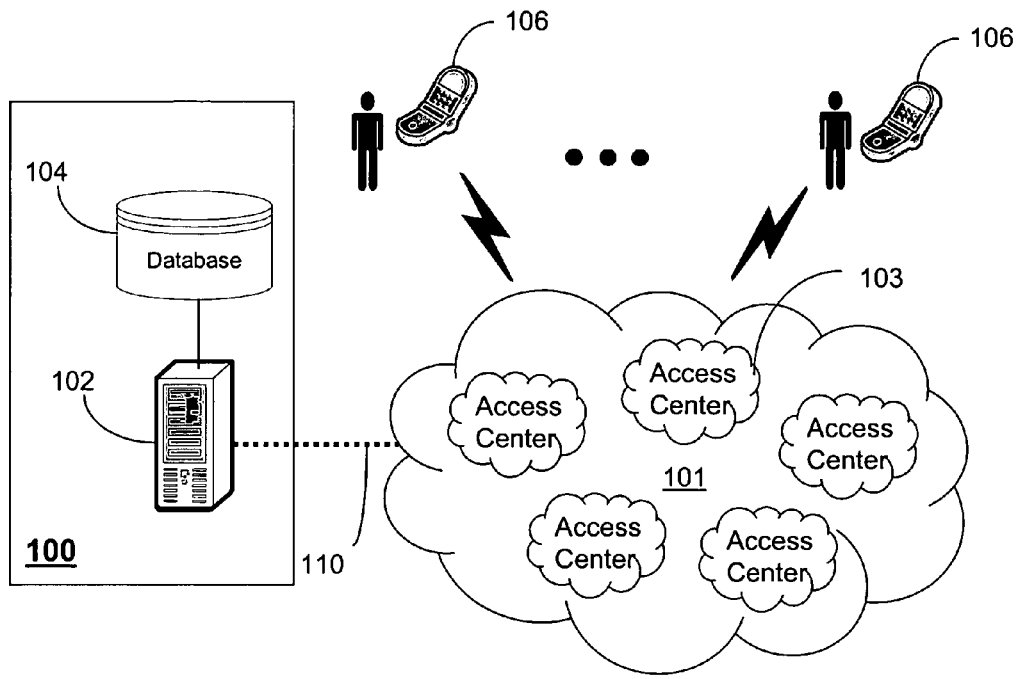
FIG. 1 is a block diagram of a network management system (NMS) and a number of multimode communication devices (MCDs) operating in a communication system according to teachings of the present disclosure.

Embodiments in accordance with the present disclosure provide a method for seamless communications between a communication device and wireless access points.

In a first embodiment of the present disclosure, a multimode communication device (MCD) can have a controller to manage operations of a global position (GPS) receiver for locating the MCD, and a multimode wireless transceiver supporting communications on a plurality of wireless access technologies. The controller can be programmed to authenticate the MCD with a first wireless access point, request a first IP address from the first wireless access point according to a Dynamic Host Configuration Protocol (DHCP), receive the first IP address, establish communications with a network management system (NMS) over the first wireless access point according to the first IP address, monitor a location of the MCD, transmit to the NMS the location of the MCD over the first wireless access point, receive over the first wireless access point a second IP address from the NMS in response to the NMS determining that the MCD is near to a second wireless access point while continuing to be within a communication range of the first wireless access point, detect the second wireless access point, authenticate the MCD with the second wireless access point, and establish communications over the second wireless access point according to the second IP address.

In a second embodiment of the present disclosure, a computer-readable storage medium in a multimode communication device (MCD) can have computer instructions for receiving over a first wireless access point a second IP address from a network management system (NMS) in response to the NMS determining that the MCD is near a second wireless access point, and establishing communications with a third party communication device over the second wireless access point according to the second IP address.

In a third embodiment of the present disclosure, a computer-readable storage medium operating in an NMS can have computer instructions for transmitting to an MCD over a first wireless access point an IP address associated with a subnet of a second wireless access point when the NMS detects the MCD is near the second wireless access point.

In a fourth embodiment of the present disclosure, a network management system (NMS) can have a controller for managing operations of a communications interface for exchanging messages with a plurality of multimode communication devices (MCDs) capable of accessing a plurality of wireless access technologies. The controller can be programmed to receive from an MCD over a first wireless access point a location of the MCD, determine that the MCD is near a second wireless access point while continuing to be within a communication range of the first wireless access point, identify an available IP address associated with the second wireless access point, and transmit the IP address to the MCD for establishing communications with third party communication devices over the second wireless access point.

FIG. 1 is a block diagram of a network management system (NMS) 100 and multimode communication devices (MCDs) 106 operating in a communication system 101. The NMS 100 comprises a communications interface 110, a memory 104 and a controller 102. The communications interface 110 utilizes wired or wireless communications technology for interfacing to the communication system 101. The communications interface 110 can be represented by a circuit-switched and/or a packet-switched interface.

The controller 102 can utilize computing technology such as a scalable server to manage operations of the communications interface 110 and a database embedded in the memory 104 for storing network information such as location information relating to a number of wireless access centers 103 disbursed throughout a communications system 101, network IDs associated with one or more wireless access points (WAPs) operating in the access centers 103, and IP addresses available for communicating within a subnet of each WAP. The NMS 100 can also operate common applications such as a CRM (Customer Relationship Management) system for managing customer accounts stored in the database which includes among other things information relating to services rendered, a customer's residential address, and other pertinent service information.

Figure 2:
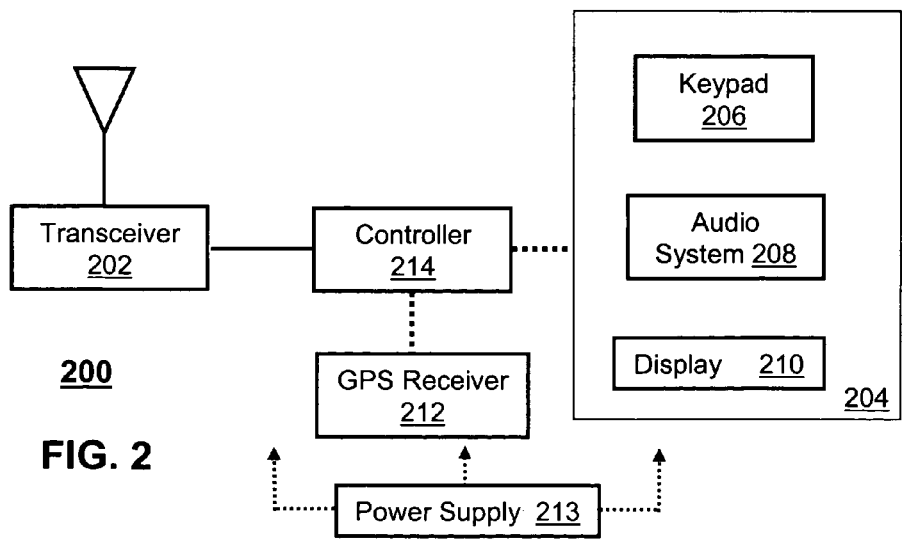
FIG. 2 is a block diagram of the MCD of FIG. 1 according to teachings of the present disclosure.

An MCD 106 is a wireless device capable of communicating with any number of wireless access technologies for data and/or voice communications. Common access technologies supported by the MCD can include cellular (CDMA, GSM, TDMA, UMTS, etc.), WiFi, ultra wideband (UWB), software defined radio (SDR), Bluetooth™, and WiMax, just to mention a few. The MCD 106 can support wireless circuit-switched voice communications or packet-switched voice communications such as voice over IP (VoIP). FIG. 2 depicts a block diagram of the MCD 106. The MCD 106 can comprise a multimode wireless transceiver 202 (herein referred to as a "transceiver"), and a controller 214 for controlling operations thereof. The transceiver 202 utilizes common multimode wireless technology to support end user communications by way of the access technologies described above.

In a supplemental embodiment, the MCD 106 can further include a user interface (UI) 204, and a GPS (Global Positioning System) receiver 212. The UI 204 can include among other things a keypad 206 with selectable navigation and depressible keys, an audio system 208 for conveying and intercepting audio messages from an end user, and a display 210 for conveying images. Each of these embodiments can serve as a means for manipulating selectable options provided by the MCD 106, and for conveying messages to the end user according to the present disclosure.

The GPS receiver 212 utilizes common technology for receiving signals from a constellation of GPS satellites for detecting a location of the MCD 106. The controller 214 can include a computing device such as a microprocessor, or digital signal processor (DSP) with associated storage devices such as RAM, ROM, DRAM, Flash, and other common memories. To support mobility, the MCD 106 can include a portable power supply 213 with technology for supplying energy to the components of the MCD 106 from one or more rechargeable batteries, and for recharging said batteries.

The communication system 101 can support a number of wireless access technologies such as cellular (GSM, CDMA, UMTS, EVDO, etc.), WiFi, UWB, WiMax, Bluetooth™, SDR, among others, for communicating with the MCDs 106. For the present illustration, it will be assumed that the MCD 106 is a dual-mode device supporting GSM and WiFi access technologies. The access centers 103 represent, for example, retailers (such as Starbucks™) or residences of MCD end users. In this illustration, the access centers 103 are scattered throughout the communication system 101 as WiFi centers with one or more wireless access points (WAPs) at each center. These centers 103 thus provide the MCDs 106 alternate or supplementary communications means to GSM.

Figure 5:
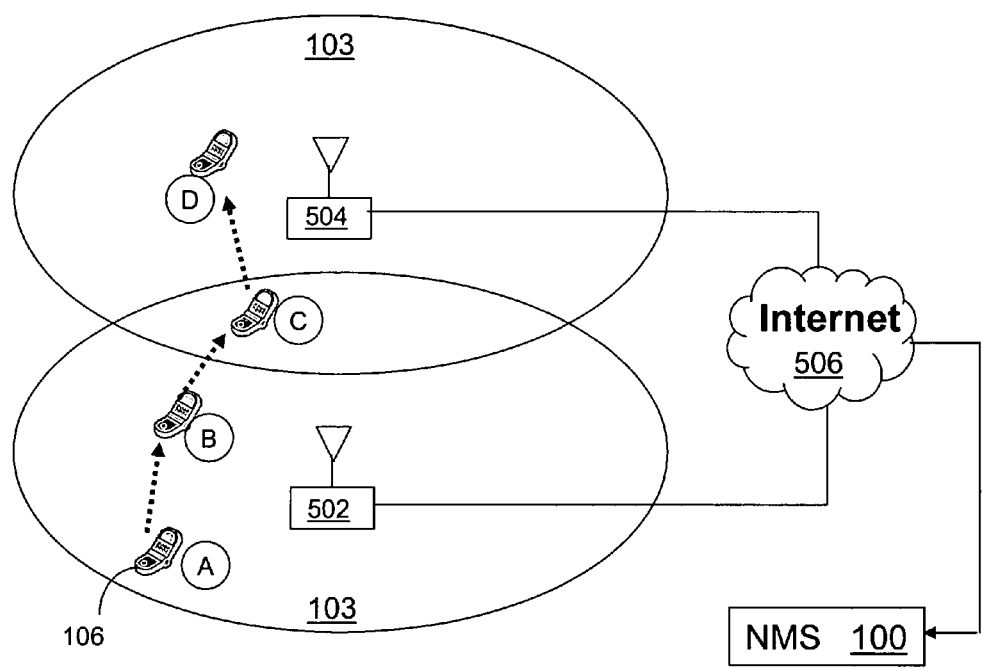
FIG. 5 is a general diagram that illustrates a route of a mobile device.

End users of the MCDs 106 can therefore switch between access technologies when it may be convenient or cost effective to do so. MCDs 106 can also roam between access centers 103 as shown in FIG. 5. As noted earlier WAPs can represent any one of the wireless access technologies discussed above. For convenience and without limiting the scope of the present disclosure, the WAPs in the access centers 103 as will be described below are assumed to be WiFi only.

Figure 3:
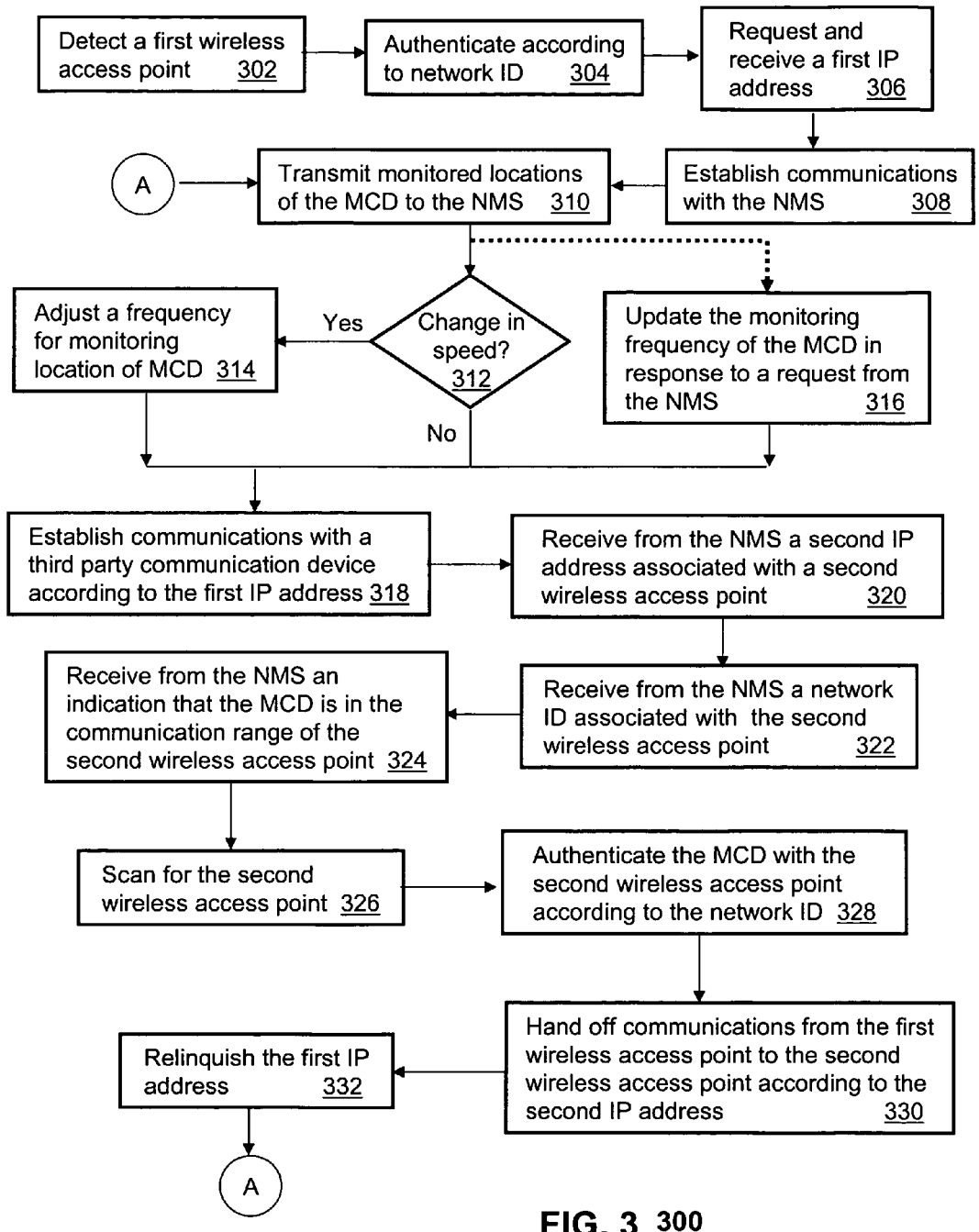
FIG. 3 depict a flowchart of a method operating in the MCD according to teachings of the present disclosure.

FIG. 3 depicts a flowchart of a method 300 operating in the MCD 106. Method 300 begins with step 301 where the controller 214 can be programmed to detect a first WAP. This step can occur upon a power-up cycle or while scanning for WAPs. Once detected, the MCD 106 proceeds to step 304 where it authenticates the MCD 106 according to a network ID. The network ID can include a service set identifier (SSID), and one or more encryption keys associated with the first WAP. The network ID can be acquired from a beacon transmitted by the first WAP, can be preprogrammed in a memory of the MCD 106, or entered by an end user by way of the UI 204. Once authenticated, the controller 214 can be programmed to request in step 306 a first IP address from a Dynamic Host Configuration Protocol (DHCP) server operating in the WAP or at a computing device coupled to the WAP. Once the first IP address is received, the controller 214 can establish communications with the NMS 100 in step 308 by way of a registration process (e.g., login and password).

In step 310, the controller 214 can be programmed to periodically transmit to the NMS 100 locations of the MCD 106 monitored by the GPS receiver 212 as directed by the controller 214. The monitoring rate can be pre-programmed during a power-up cycle of the MCD 106 and updated as needed in step 312. In accordance with the locations tracked, the controller 214 can be programmed to determine a speed of travel of the MCD 106. If in step 312, the controller 214 detects a change in speed, it can be further programmed to adjust in step 314 the monitoring frequency used by the controller 214 to track the location of the MCD 106. If, for example, the speed of travel of the MCD 106 has increased, the controller 214 can in response increase the monitoring frequency in order to provide the NMS 100 better location resolution to trace the route and rate of movement of the MCD 106. If, on the other hand, the controller 214 detects a decrease in the speed of the MCD 106, it can lower its monitoring rate in order to reduce the amount of information it transmits to the NMS 100. Alternatively, a request for adjusting the monitoring rate can come from the NMS 100 in step 316, which directs the controller 214 to adjust the monitoring frequency in step 310.

In step 318, the controller 214 can receive from, for example, an end user by way of the UI 204 a request to establish communications with a third party communication device (e.g., another MCD or computing device) according to the first IP address. Said communications can comprise VoIP communications, and/or general data communications over the Internet. While these communications are taking place, the controller 214 can be programmed to receive over the first WAP a second IP address from the NMS 100 in response to the NMS 100 determining that the MCD 106 is near to a second WAP. Referring to position A of FIG. 5, step 318 may not occur until the MCD 106 is in position B while still communicating with the first WAP. In anticipation of a transition to the second WAP, the controller 214 can be programmed to receive a network ID (e.g., SSID and encryption keys) associated with the second WAP. With the second IP address and the network ID of the second WAP, the controller 214 can quickly handoff communications between the first WAP to the second WAP with potentially an imperceptible impact to the on-going communications with the third party communication device established in step 318 over the first WAP.

Once the MCD 106 is within the communication range of the NMS 100, the controller 214 can receive in step 324 an indication from the NMS 100 that it is in the communication range of the second WAP. This step can help to conserve energy in the MCD 106 by scanning WAPs only when they are known to be available. For example, referring back to FIG. 5, once the NMS 100 detects that the MCD 106 is within an overlap region between the first and second WAPs (as shown in position C), it can notify the MCD 106 that it can successfully scan for the second WAP in step 326.

Once detected, the controller 214 can authenticate in step 328 the MCD 106 according to the network ID associated with the second WAP. In step 330, the controller 214 can be further programmed to handoff communications from the first WAP to the second WAP according to the second IP address associated with the second WAP. By providing the MCD 106 the network ID and IP address to the second WAP in steps 320-322 prior to the MCD 106 being within the communication range of the second WAP, the communications handoff can occur quickly with no impact or imperceptible impact to the communications previously established with the third party communication device over the first WAP.

To efficiently manage the use of IP addresses, the controller 214 can be further programmed in step 332 to relinquish the first IP address thereby making it available to other devices roaming into the first WAP. From step 332, the aforementioned steps can be repeated starting from step 310. If, for example, the MCD 106 roams from position D (see FIG. 5) near to another WAP or back to the first WAP, the controller 214 can receive a network ID and corresponding IP address of the approaching WAP as an a priori set up for a seamless handoff.

Figure 4:
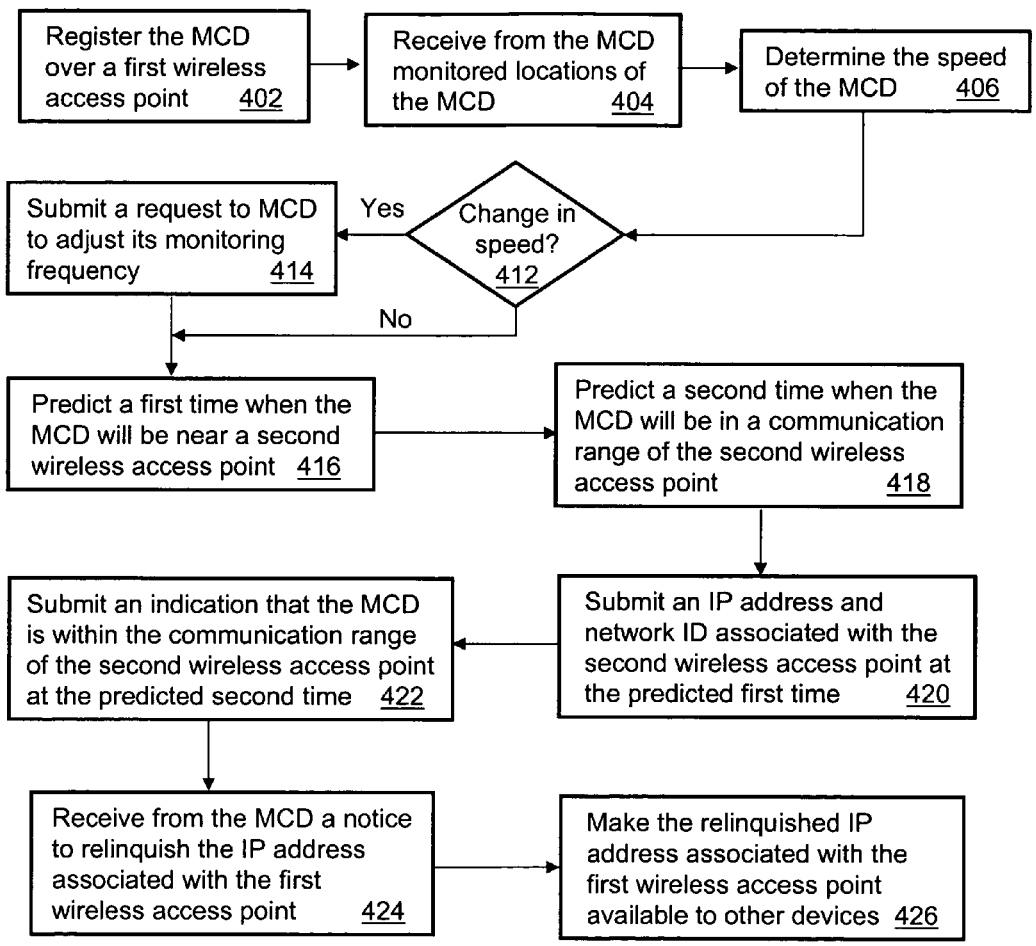
FIG. 4 depicts a flowchart of a method operating in the NMS according to teachings of the present disclosure.

FIG. 4 depicts a flowchart of a method 400 operating in the NMS 100 that mirrors some of the functions described in FIG. 3. Method 400 begins with step 402 where the controller 102 of the NMS 100 can be programmed to register the MCD 106 over the first WAP. In step 404, the controller 102 can receive from the MCD 106 the monitored locations of the MCD. In step 406, the controller 102 can determine the speed of the MCD 106. If there is change in speed detected in step 412, the controller 102 proceeds to step 414 where it submits a request to the MCD 106 to adjust its monitoring frequency based on a detected increase or decrease in speed as described above in method 300. If there is a nominal change in speed or no change at all, the controller 102 can be programmed to proceed to step 416.

By knowing the traceable route of the MCD 106 (as shown in FIG. 5), the MCD's speed, and the location of the WAPs disbursed throughout the communication system 101 (stored in, for example, the database 104), the controller 102 can be programmed to predict in step 416 a first time when the MCD 106 will be near the second WAP. The first predicted time can be, for example, the time it would take to travel from position A to position B as illustrated in FIG. 5. Similarly, in step 418, the controller 102 can be further programmed to predict a second time when the MCD 106 will be in a communication range of the second WAP while maintaining communications with the first WAP. This can be the travel time from position A to position C in FIG. 5.

Thus in step 420, the controller 102 can be programmed to submit an IP address and network ID associated with the second WAP at the first predicted time. In step 422, the controller 102 can be further programmed to submit an indication to the MCD 106 that it is in the communication range of the second WAP at the second predicted time. The predictions in steps 416-418 can be verified by steps 420-422 (or prior to these steps) by comparing the last known location of the MCD 106 to its predicted target location. If these verifications prove to falsify the prediction, the controller 102 can be programmed to repeat steps 416-418 and the steps that follow.

Upon receiving the network ID and IP address of the second WAP, the MCD 106 can handoff communications from the first to the second WAP and relinquish the IP address of the first WAP as described earlier in method 300. The relinquishing notice can be received by the controller 102 in step 424. Accordingly, the controller 102 proceeds to step 426 where it makes the IP address of the first WAP available to other devices roaming thereto.

The foregoing embodiments described by methods 300-400 move the DHCP server functions to interactions between the MCD 106 and the NMS 100 which has the capability of tracking the MCD 106 relative to the known locations of the WAPs. By providing network IDs and IP addresses associated with an upcoming WAP, the MCD 106 can perform a nearly seamless transition or handoff of communications, thereby improving the overall end user experience. As noted earlier, a WAP can represent all forms of wireless access technologies not just WiFi. For example, a WAP can represent a cellular base station, WiMax, Bluetooth, Ultra Wideband (UWB), SDR, and so on. Consequently, the embodiments described above can be applied to a WiFi to cellular handoff, a cellular to WiMax handoff, a WiMax to Bluetooth handoff, UWB to UWB handoff, and so on. The combinations and permutations possible can be endless and can best be identified by the claims described below.

Figure 6:
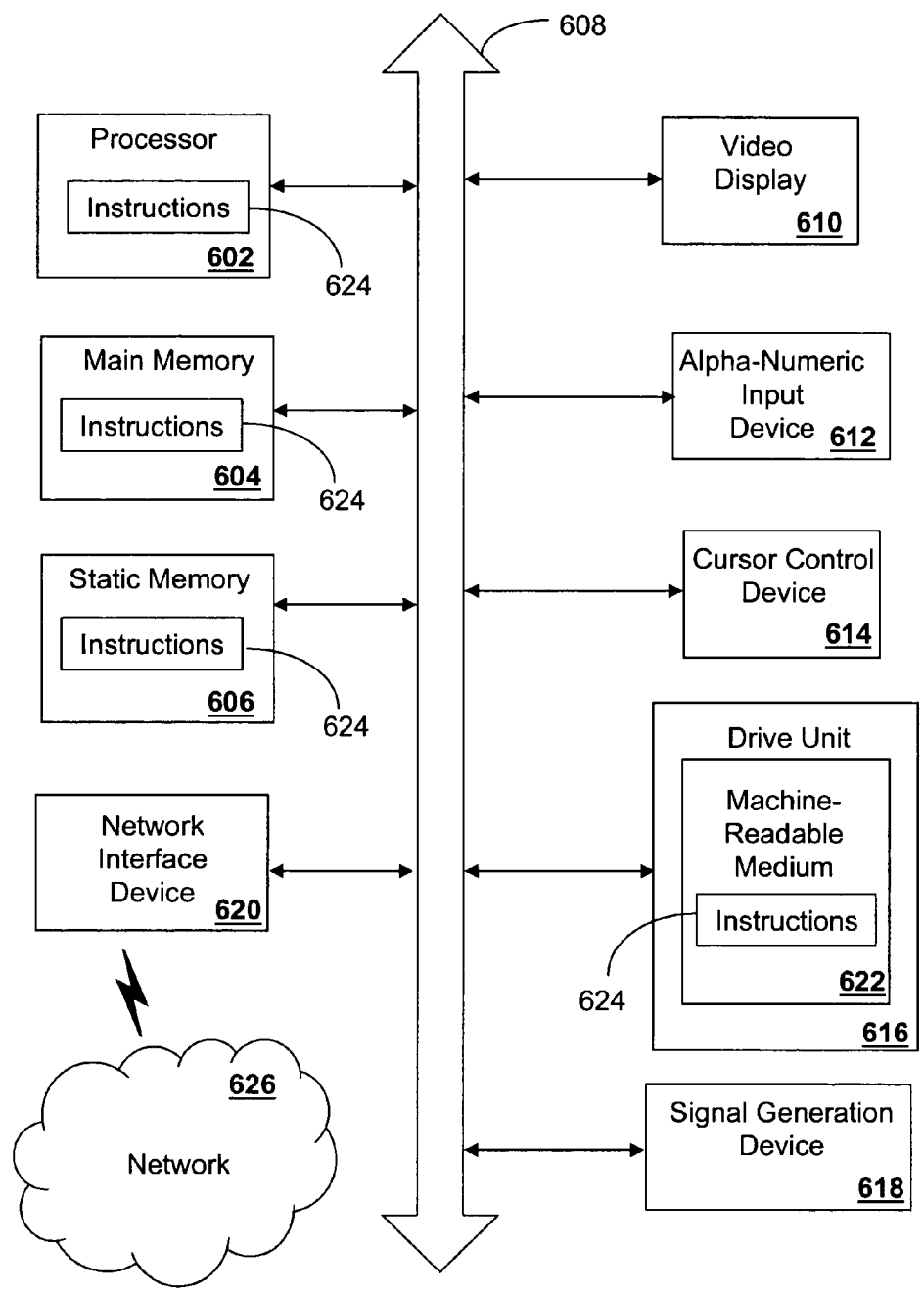
FIG. 6 is a diagrammatic representation of a machine in the form of a computer system within which a set of instructions, when executed, may cause the machine to perform any one or more of the methodologies discussed herein.

FIG. 6 is a diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a controller to manage operations of a global position receiver to locate a multimode communication device, and
   a multimode wireless transceiver supporting communications on a plurality of wireless access technologies, wherein the controller is configured to:
   authenticate the multimode communication device with a first wireless access point;
   request a first internet protocol address from the first wireless access point according to a dynamic host configuration protocol;
   receive the first internet protocol address;

establish communications with a network management system over the first wireless access point according to the first internet protocol address;

monitor a location of the multimode communication device;

receive a frequency adjustment request from the network management system;

adjust a frequency of monitoring the location of the multimode communication device according to the frequency adjustment request;

transmit the location of the multimode communication device to the network management system according to the adjusted frequency of monitoring the location of the multimode communication device;

transmit to the network management system the location of the multimode communication device over the first wireless access point;

receive over the first wireless access point a second internet protocol address from the network management system in response to a prediction made by the network management system that at least a second wireless access point will be within a first communication range of the multimode communication device while continuing to be within a second communication range of the first wireless access point, wherein the prediction is made by the network management system prior to communications between the multimode communication device and the second wireless access point based on a speed of the multimode communication device, a route of the multimode communication device and locations of a plurality of wireless access points including the second wireless access point, and wherein the prediction is made by the network management system without scanning being performed for the second wireless access point by the multimode communication device, network management system and second wireless access point;

detect the second wireless access point;

authenticate the multimode communication device with the second wireless access point; and establish communications over the second wireless access point according to the second internet protocol address.

2. The device of claim 1, wherein the controller is further configured to:
establish communications with a third party communication device over the first wireless access point; and
handoff communications with the third party communication device from the first wireless access point to the second wireless access point according to the second internet protocol address.

3. The device of claim 2, wherein the controller is further configured to relinquish the first internet protocol address in response to the communications handoff between the first and second wireless access points.

4. The device of claim 2, wherein the communications handoff between the first and second wireless access points minimally impacts communications between the multimode communication device and the third party communication device.

5. The device of claim 2, wherein the controller is further configured to process communications between the multimode communication device and the third party communication device according to a voice over internet protocol communications protocol.

6. The device of claim 1, wherein the controller is further configured to authenticate the multimode communication device with the first wireless access point according to a network identification.

7. The device of claim 6, wherein network identification comprises a service set identifier (SSID), and one or more encryption keys associated with the first wireless access point.

8. The device of claim 1, wherein the controller is programmed further configured to:
detect a change in speed of the multimode communication device according to the monitored location of the multimode communication device;
adjust the frequency of monitoring the location of the multimode communication device according to the detected change in speed to generate a second frequency of monitoring the location; and
transmit the location of the multimode communication device to the network management system according to the second frequency.

9. The device of claim 1, wherein the second internet protocol address is received from the network management system at a target time that is based on the prediction of when the multimode communication device will be near to the second wireless access point.

10. The MCD of claim 9, wherein the controller is further configured to:
receive an indication from the network management system when the multimode communication device is within a communication range of the second wireless access point;
scan for the second wireless access point in response to the indication;
receive from the network management system a network identification associated with the second wireless access point in response to the network management system determining that the multimode communication device is near to the second wireless access point; and
authenticate the multimode communication device with the second wireless access point according to the network identification.

11. A system, comprising:
a controller to manage operations of a communications interface to exchange messages with a plurality of multimode communication devices capable of accessing a plurality of wireless access technologies, wherein the controller is programmed configured to:
register an multimode communication device over a first wireless access point, wherein the multimode communication device authenticates with the first wireless access point and establishes communications with a network management system over the first wireless access point according to a first internet protocol address assigned to the multimode communication device;
receive first monitored locations of the multimode communication device;
monitor a speed of the multimode communication device according to the first monitored locations of the multimode communication device;
transmit a frequency adjustment request to the multimode communication device according to the monitored speed;
receive from the multimode communication device over the first wireless access point second monitored locations of the multimode communication device according to a frequency of monitoring the monitored locations that is adjusted based on the frequency adjustment request;

determine according to the second monitored locations that at least a second wireless access point will be within a first communication range of the multimode communication device while continuing to be within a second communication range of the first wireless access point, wherein the determination is made by the network management system, wherein the determination is made by the network management system prior to communications between the multimode communication device and the second wireless access point based on the speed of the multimode communication device, a route of the multimode communication device and locations of a plurality of wireless access points including the second wireless access point, and wherein the determination is made by the network management system without scanning being performed for the second wireless access point by the multimode communication device, network management system and second wireless access point;

identify an available internet protocol address associated with the second wireless access point; and transmit the internet protocol address to the multimode communication device to establish communications with third party communication devices over the second wireless access point.

12. The system of claim 11, wherein the frequency adjustment request comprises a request for a faster rate of monitoring the location of the multimode communication device in response to a detected increase in the speed of the multimode communication device, or a request for a slower rate of monitoring the location of the multimode communication device in response to a detected decrease in the speed of the multimode communication device.

13. The system of claim 11, wherein the controller is further configured to:

predict a time when the multimode communication device will be near the second wireless access point according to one or more of the second monitored locations of the multimode communication device and the speed; and transmit the internet protocol address to the multimode communication device at the predicted time.

14. The system of claim 13, wherein the controller is further configured to:

identify a network identification associated with the second wireless access point, wherein the network identification comprises a service set identifier, and one or more encryption keys associated with the second wireless access point; and transmit the network identification to the multimode communication device at the predicted time.

15. The system of claim 11, wherein the controller is further configured to:

predict a time when the multimode communication device will be in a communication range of the second wireless access point according to one or more of the second monitored locations of the multimode communication device and the speed; and transmit to the multimode communication device at the predicted time an indication that the multimode communication device can begin to scan for the second wireless access point.

16. The system of claim 11, wherein the controller is further configured to:

receive from the MC multimode communication device a notice to relinquish an alternate internet protocol address associated with the first wireless access point in response to a handoff of communications by the multimode communication device from the first wireless access point to the second wireless access point; and make available the alternate internet protocol address for other devices requesting communication with the first wireless access point.

17. A method comprising:

authenticating a multimode communication device with a first wireless access point;

requesting a first internet protocol address from the first wireless access point according to a dynamic host configuration protocol;

receiving, at the multimode communication device, the first internet protocol address;

establishing communications with a network management system over the first wireless access point according to the first internet protocol address;

monitoring a location of the multimode communication device;

receiving a frequency adjustment request from the network management system;

adjusting a frequency of monitoring the location of the multimode communication device according to the frequency adjustment request;

transmitting the location of the multimode communication device to the network management system according to the adjusted frequency of monitoring the location of the multimode communication device;

transmitting to the network management system the location of the multimode communication device over the first wireless access point;

receiving over the first wireless access point a second internet protocol address from the network management system in response to a prediction made by the network management system that at least a second wireless access point will be within a first communication range of the multimode communication device while continuing to be within a second communication range of the first wireless access point, wherein the prediction is made by the network management system prior to communications between the multimode communication device and the second wireless access point based on a speed of the multimode communication device, a route of the multimode communication device and locations of a plurality of wireless access points including the second wireless access point, and wherein the prediction is made by the network management system without scanning being performed for the second wireless access point by the multimode communication device, network management system and second wireless access point;

detect the second wireless access point;

authenticating the multimode communication device with the second wireless access point; and establishing communications over the second access point according to the second internet protocol address.

* * * * *